United States Patent Office 3,415,616
Patented Dec. 10, 1968

---

3,415,616
EXTRACTION OF VANADIUM AND MOLYBDENUM WITH A PHENOLIC OXIME
Donnell W. Agers, Kankakee, Ill., and Ronald R. Swanson, New Hope, Minn., assignors to General Mills, Inc., a corporation of Delaware
No Drawing. Filed Mar. 3, 1966, Ser. No. 531,374
9 Claims. (Cl. 23—22)

The present invention relates to the extraction of vanadium or molybdenum values from aqueous solutions and in particular to a liquid ion exchange extraction process.

We have now discovered that a class of substituted hydroxy benzophenoximes are suited for this purpose. The basic structure for the hydroxy benzophenoximes is as follows:

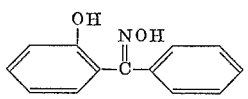

The compounds which are useful for the present invention have the above basic structure but are substituted by an aliphatic group or groups so as to have a suitable degree of solubility in a hydrocarbon solvent to be used for the liquid-liquid ion exchange separation. These separations are usually conducted by having the ion exchange reagent dissolved in a water immiscible hydrocarbon solvent. The preferred solvents of this type are the aliphatic hydrocarbon solvents such as the petroleum-derived liquid hydrocarbons, either straight chain or branched, such as kerosene, fuel oil, etc. Various aromatic solvents may also be used, such as benzene, toluene, xylene and other aromatic solvents, for example, those derived from petroleum processing which may contain alkyl substituted aromatic materials. Typical of the latter solvents are those sold under the Panasol trademark by Amoco Chemicals Corporation, both in the "RX" and the "AN" series. These solvents are liquid and essentially insoluble in water. Generally, all these hydrocarbon solvents have specific gravities in the range of 0.65–0.95 and have a mid-boiling point in the approximate range of 120° F.–615° F. (ASTM Distillation). In addition to the simple hydrocarbon solvents, the chlorinated hydrocarbons may also be used and in some instances may improve solubility. Accordingly, both the unsubstituted and the chlorinated solvents are contemplated by the term "liquid hydrocarbon."

The benzophenoximes, which may be used in the present invention, are those which have sufficient solubility in one or more of the above solvents or mixtures thereof to make a 2% solution and which are essentially insoluble or immiscible with water. At the same time, the ion exchange reagent should form a complex with the vanadium or the molybdenum which complex, likewise, is soluble in the organic solvent to at least the extent of 2% by weight. These characteristics are achieved by having alkyl or alkoxy substituents on either ring. Generally, it is necessary to have substituents which total at least 3 carbon atoms. This minimum may be obtained by means of a total of 3 methyl groups distributed on either one or on the two rings, by means of a methyl and an ethyl group, by means of a propyl group, etc. Usually it is preferred not to have more than 25 carbon atoms total in the substituents since these substituents contribute to the molecular weight of the oxime without improving operability. Large substituents, therefore, increase the amount of oxime for a given metal loading capacity. In general, the branched chain alkyl substituents effect a greater degree of solubility of the reagent and of the metal complex and, accordingly, these are preferred. A variety of typical compounds useful for the present invention include the following:

2-hydroxy-3'-methyl-5-ethylbenzophenoxime
2-hydroxy-5-(1,1-dimethylpropyl)-benzophenoxime
2-hydroxy-5-(1,1-dimethylethyl)-benzophenoxime
2-hydroxy-5-octylbenzophenoxime
2-hydroxy-5-nonyl-benzophenoxime
2-hydroxy-5-dodecyl-benzophenoxime
2-hydroxy-2',4'-dimethyl-5-octylbenzophenoxime
2-hydroxy-2',3',5'-trimethyl-5-octylbenzophenoxime
2-hydroxy-3,5-dinonylbenzophenoxime
2-hydroxy-4'-(1,1-dimethylethyl)-5-(2-pentyl)-benzophenoxime
2-hydroxy-4'-(1,1-dimethylethyl)-5-(2-butyl)-benzophenoxime
2-hydroxy-4-dodecyloxybenzophenoxime
2-hydroxy-4'-(1,1-dimethylethyl)-5-methylbenzophenoxime
2-hydroxy-4',5 bis (1,1-dimethylethyl) benzophenoxime A wide variety of other compounds within the scope of the present invention may, likewise, be devised and it is a simple matter to determine their effectiveness by simply testing the solubility of the compounds in one or more of the above hydrocarbon solvent or mixtures thereof. In general, the aromatic or aliphatic substituted aromatic hydrocarbon solvents are preferred from the standpoint of improved solubility.

The extractants of the present invention may be made by any of a variety of classical synthesis routes. These routes involve the formation of the benzophenone from known starting materials followed by the conversion of the benzophenone to the benzophenoxime. Two suitable methods of making the benzophenone include the following: One such method is that reported by Newman (J. Org. Chem., 19, 985–1002 (1954)). This method involves the reaction of a substituted phenol with a benzotrichloride in accordance with the following equation:

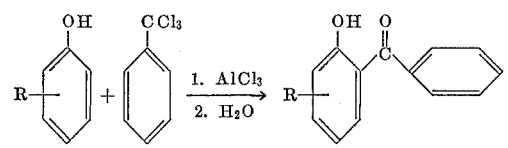

A second method involves the rearrangement where a phenolic ester is rearranged to a benzophenone in accordance with the following equation:

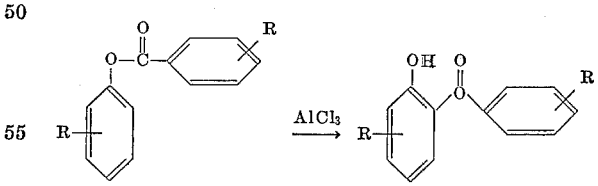

Typically commercially available p-substituted alkyl phenols which may be used in these methods include the following:

sec-butylphenol
tert-butylphenol
2,4-di-tert-butylphenol
octylphenol
nonylphenol
dinonylphenol
dodecylphenol
amylphenol Of these methods, the first is preferred as the second method involves some side reactions which reduce yields.

A third method of producing compounds of this type is illustrated in the following sequence:

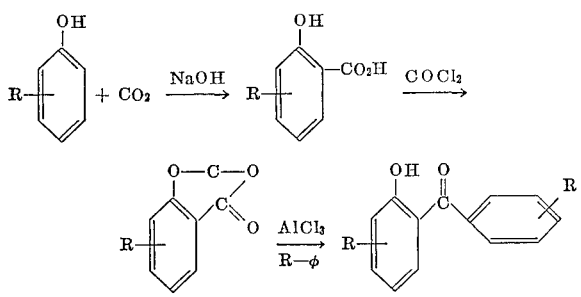

The particular method which may be employed to produce the extractant may depend upon the particular compounds available as starting materials and the efficacy of the particular method as applied to such starting materials. However, all of the compounds covered by the present invention may be produced by one or more of these methods in combination with classical synthesis methods which may be used for the preparation of starting materials for the final reactions.

As indicated above, these benzophenoximes are useful for the extraction of vanadium or molybdenum from acid solutions, preferably in the approximate range of 4.0 to approaching 0.

In some instances, it may be desirable to adjust the pH either initially or during the course of the extraction to effect desirable rates of extraction and desirable degrees of depletion of the starting solution.

The following examples will illustrate the preparation of a typical extractant and also the process of effecting the extraction using such extractant. It is to be understood, however, that these examples are illustrative only and not as limiting the invenion.

EXAMPLE 1

(a) Preparation of 2-hydroxy-5-dodecylbenzophenoxime 2-hydroxy-5-dodecylbenzophenoxime was prepared by the following method: 346.7 grams (2.6 moles) of aluminum chloride and 1900 ml. of carbon disulfide were added to a 5 liter round bottom flask equipped with a stirrer, thermometer and addition funnel. The mixture was cooled to 0° C. 524.8 grams (2 moles) of dodecylphenol was mixed with 100 ml. of carbon disulfide and then added at 0° to the flask. The flask was cooled to —15 to —20°. 391 grams (2 moles) of benzotrichloride was then added at temperatures of —15 to —20° over a period of 13 minutes. The flask was warmed to 0 to 5° and held for 1 hour. 1 liter of methanol was added at 0 to 5° followed by 500 ml. of water at the same temperatures. The mixture was heated and at 25° C., steam was passed through and continued to heat until a temperature of 100° C. was reached. The mixture was then cooled and poured into dilute hydrochloride acid and extracted with diethyl ether and dried over sodium sulfate. The solvent was stripped off and the residue was stripped and a fraction of 288.7 grams of 2-hydroxy-5-dodecylbenzophenone was recovered. This benzophenone was converted to the oxime by a standard method.

(b) Extraction of vanadium

A vanadium containing solution was made by dissolving sodium orthovanadate and sulfuric acid in water. The solution assayed 0.0419 M $V^{+5}$ had a pH of 0.5. A 5% solution of 2-hydroxy-5-dodecylbenzophenoxime in kerosene was prepared. It was used to extract the vanadium solution in accordance with the following ratios of organic to aqueous phase. The following table indicates the results obtained at various organic to aqueous ratios, the table also indicating the concentration of the vanadium in the stripped aqueous solution.

TABLE

| O/A | $[V^{+5}]$ aq. | Percent $V^{+5}$ extracted |
|---|---|---|
| 20/15 | 0.0136 | 67.5 |
| 20/25 | 0.0199 | 52.5 |
| 10/25 | 0.0311 | 26.0 |
| 10/50 | 0.0359 | 14.0 |

EXAMPLE 2

A 5% solution of 2-hydroxy-5-dodecylbenzophenoxime in kerosene was used to extract a molybdenum containing solution which assayed 0.077 M $Mo^{+6}$ and had a pH of 0.5. This solution had been prepared from sodium molybdate, sulfuric acid and water. The molybdenum containing solution was extracted with the dodecylbenzophenoxime and the results are indicated in the following table:

TABLE

| O/A | $[Mo^{+6}]$ aq. | Percent $Mo^{+6}$ extracted |
|---|---|---|
| 50/5 | 0.024 | 69 |
| 20/15 | 0.054 | 30 |
| 20/25 | 0.060 | 22 |
| 10/25 | 0.071 | 8 |
| 10/50 | 0.073 | 5 |

The metal values from the above examples may be stripped by contacting the pregnant organic phase with an alkaline stripping solution such as aqueous ammonia-ammonium carbonate solution. They may also be stripped by aqueous sulfur dioxide solutions or by means of strong acids.

A further aspect of the present invention is the possibility that the use of the benzophenoximes of the present invention, in combination with certain aliphatic oximes, may result in an improvement in the kinetics of the extraction.

The α-hydroxy aliphatic oxime extractants which may also be used in the present invention are those described in prior application Ser. No. 260,848, filed Feb. 25, 1963, now Patent No. 3,224,873. They have the following general formula:

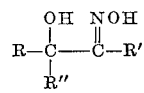

where R, R' and R" may be any of a variety of organic hydrocarbon radicals such as aliphatic and alkylaryl radicals. R" may also be hydrogen. Preferably, R and R' are unsaturated hydrocarbon or branched chain alkyl groups containing from about 6 to 20 carbon atoms. R and R' are also preferably the same and when alkyl are preferably attached to the carbons substituted with the —OH and =NOH groups through a secondary carbon atom. It is also preferred that R" is hydrogen or unsaturated hydrocarbon or branched chain alkyl groups containing from about 6 to 20 carbon atoms. The α-hydroxy oximes also preferably contain a total of about 14 to 40 carbon atoms. Representative compounds are 19-hydroxyhexatriaconta-9,27-dien-18-oxime, 5,10-diethyl-8-hydroxytetradecan-7-oxime, and 5,8-diethyl-7-hydroxydodecane-6-oxime. The latter compound has the following structural formula:

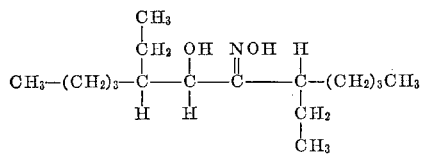

Representative of other mono- and polyunsaturated radicals are heptenyl, octenyl, decenyl, octadecenyl, octadecynyl and alkyl substituted radicals such as ethyloctadecenyl. Representative of other mono- and polyalkyl substituted saturated radicals are ethylhexyl, diethylheptyl, butyldecyl, butylhexadecyl, ethylbutyldodecyl, butylcyclohexyl and the like.

The α-hydroxy oxime extractants are also characterized as having a solubility of at least 2% by weight in the hydrocarbon solvent used to make up the organic phase and substantially complete insolubility in water. In addition, it is believed that the vanadium and molybdenum values and the α-hydroxy oxime extractant form a complex during the initial extraction step and such complex, when formed, should also have a solubility of at least 2% by weight in the hydrocarbon solvent.

The relative amounts of the two extractants can be varied widely. Even minute quantities of the α-hydroxy aliphatic oxime may be used. The amount of the extractants in the organic solvent likewise can vary within considerable limits. In general, however, the concentration of total oxime is in the range 2-25%, based on the weight of the organic extracting solution, preferably in the range of 5-15%.

EXAMPLE 3

An aqueous solution containing 25 g./l. of molybdenum as $Na_2MoO_4$. Portions of the solution were acidified with sulfuric acid to the pH's indicated below. The aqueous solutions were then extracted with a 10% solution in kerosene of a combination of 2-hydroxy-5-dodecylbenzophenoxime and 5,8-diethyl-7-hydroxydodecane-6-oxime with the two oximes employed in the weight ratio of 5 to 2. The aqueous molybdenum solutions were then extracted with the organic and the results obtained are indicated in the following table:

| pH: | Mo in organic, g./l. |
|---|---|
| 1.5 | 2.45 |
| 2.5 | 1.65 |

Repeated contacts of the aqueous molybdenum solution having a pH of 1.5 reduced the molybdenum level from 25 g./l. to less than 0.05 g./l. The molybdenum was stripped from the aqueous solution with a 5% ammonium hydroxide solution.

The present invention is useful for the extraction and recovery of molybdenum and vanadium values not only from aqueous solutions derived from ores for the primary objective of the production of molybdenum and vanadium but also the removal and/or recovery of molybdenum and vanadium from other aqueous solutions where the primary objective may not be the production of vanadium and molybdenum. For example, in the wet method of producing phosphoric acid, there results what is known as green acid. Green acid contains some vanadium as an impurity. This vanadium is present in sufficient concentrations so that the green phosphoric acid is not useful in production of fertilizers. The present process may be used to remove this vanadium. In this connection, in the event that the vanadium is present in the quadrivalent form, it should be first oxidized to the pentavalent form before the extraction.

While the above description has been with particular reference to the specific examples, it is to be understood that the invention is not restricted thereto but may be varied within the scope of the appended claims.

The embodiments of the invention in which an exclusive property or privilege is claimed are defined as follows:

1. Process for the separation of metal values selected from the group consisting of vanadium and molybdenum from an aqueous solution containing the same, comprising: (1) contacting said aqueous solution with an organic phase comprising a liquid hydrocarbon and a 2-hydroxy benzophenoxime selected from the group consisting of alkyl substituted and alkoxy substituted 2-hydroxy benzophenoximes to extract at least a portion of the said metal values into the organic phase, said 2-hydroxy benzophenoxime having a solubility of at least 2% by weight in the liquid hydrocarbon, and (2) separating the resultant metal-pregnant organic phase from the aqueous phase.

2. Process according to claim 1 in which the metal values are stripped from the organic phase.

3. Process according to claim 2 in which the metal values are stripped from the organic phase by means of an alkaline solution.

4. Process according to claim 1 in which the aqueous solution being extracted has a pH in the range of 0 to 4.

5. Process according to claim 1 in which the liquid hydrocarbon is kerosene.

6. Process according to claim 1 in which the liquid hydrocarbon is aromatic.

7. Process according to claim 1 in which the liquid hydrocarbon is an alkyl-substituted aromatic compound.

8. Process according to claim 1 in which the liquid hydrocarbon also contains an α-hydroxy oxime having a solubility of at least 2% by weight in the liquid hydrocarbon and having the formula:

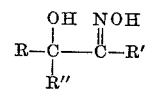

where R and R' are organic hydrocarbon radicals and R" is selected from the group consisting of hydrogen and organic hydrocarbon radicals.

9. Process according to claim 1 in which the 2-hydroxy benzophenoxime is 2-hydroxy 5-dodecyl benzophenoxime.

References Cited

UNITED STATES PATENTS

| 3,083,085 | 3/1963 | Lewis et al. | 23—15.5 |
| 3,224,873 | 12/1965 | Swanson | 75—101 |
| 3,348,906 | 10/1967 | Henrickson et al. | 23—22 |

RICHARD O. DEAN, *Primary Examiner.*

U.S. Cl. X.R.

23—24, 51; 75—121, 101